US010110769B2

(12) United States Patent
Medicherla et al.

(10) Patent No.: US 10,110,769 B2
(45) Date of Patent: Oct. 23, 2018

(54) COMPUTER IMPLEMENTED SYSTEM AND METHOD FOR MANAGING A STACK CONTAINING A PLURALITY OF DOCUMENTS

(71) Applicant: Tata Consultancy Services Ltd., Maharashtra (IN)

(72) Inventors: Vithal Satya Naga Prabhakara Medicherla, Andhra Pradesh (IN); Suresh Babu Ponnan, Tamil Nadu (IN); Ohm Kumar Balasubramanian, Tamil Nadu (IN)

(73) Assignee: TATA CONSULTANCY SERVICES LTD., Mumbai, Maharashtra (IN)

( * ) Notice: Subject to any disclaimer, the term of this patent is extended or adjusted under 35 U.S.C. 154(b) by 480 days.

(21) Appl. No.: 14/581,206

(22) Filed: Dec. 23, 2014

(65) Prior Publication Data
US 2016/0127599 A1 May 5, 2016

(30) Foreign Application Priority Data
Nov. 4, 2014 (IN) .......................... 3477/MUM/2014

(51) Int. Cl.
*H04N 1/21* (2006.01)
*G06F 17/30* (2006.01)
(Continued)

(52) U.S. Cl.
CPC ..... *H04N 1/2166* (2013.01); *G06F 17/30011* (2013.01); *G06Q 10/087* (2013.01); *H04N 1/00002* (2013.01); *H04N 1/04* (2013.01)

(58) Field of Classification Search
CPC ............ G06F 17/301; G06F 17/30144; G06F 17/30194; G06F 17/3007; G06F 17/30094;
(Continued)

(56) References Cited

U.S. PATENT DOCUMENTS 5,813,009 A 9/1998 Johnson et al.
6,546,385 B1 * 4/2003 Mao .................. G06F 17/30011
382/248
(Continued)

FOREIGN PATENT DOCUMENTS

WO 2007/106851 A2 9/2007
WO 2009/073032 A1 6/2009

OTHER PUBLICATIONS

State of Montana ECMS RFI, State of Montana, Request for Information, Dec. 20, 2013, 43 pages.
(Continued)

*Primary Examiner* — Allen H Nguyen
(74) *Attorney, Agent, or Firm* — Westman, Champlin & Koehler, P.A.

(57) ABSTRACT

A computer implemented system and method for managing a stack containing a plurality of documents. The system scans and manages documents provided by the users in form of batches. Multiple users can provide the documents to be managed in form of a stack that contains the documents separated by separating pages and submission forms. The submission forms are then identified by the system to identify the batches and allot track numbers to the identified batches for future reference. Documents within the batches are identified by the separating pages and are allotted barcodes for identification. These documents are scanned and processed to obtain quality checked images of the documents which are then stored in a central repository. The system allows the users to change/set prioritization of a request or document type and also allows automatic indexing, routing of the transactions, processing, quality checking, and modification in the scanned images.

17 Claims, 6 Drawing Sheets

(51) Int. Cl.
*H04N 1/04* (2006.01)
*G06Q 10/08* (2012.01)
*H04N 1/00* (2006.01)

(58) Field of Classification Search
CPC ......... G06F 17/30115; G06F 17/30312; G06F 17/3001; G06F 17/30002; G06F 17/3002; G06F 17/30038; G06F 17/30067; G06F 17/30015; G06F 17/30174; G06F 17/3061; G06F 17/30725; G06F 17/30705; G06F 17/30011; G06Q 10/10; G06Q 10/107; G06Q 10/087; H04N 1/2166; H04N 1/00002; H04N 1/04; H04N 1/2179; H04N 1/2187; H04N 2201/3225; H04N 2201/3226; H04N 2201/3229
USPC ........................................................ 358/403
See application file for complete search history.

(56) References Cited

U.S. PATENT DOCUMENTS

| | | | |
|---|---|---|---|
| 6,581,039 B2 * | 6/2003 | Marpe | G06Q 10/10 345/594 |
| 7,676,512 B2 | 3/2010 | Yamamoto et al. | |
| 7,798,417 B2 | 9/2010 | Snyder et al. | |
| 7,942,328 B2 * | 5/2011 | Snyder | G06K 7/10544 235/375 |
| 8,014,039 B2 * | 9/2011 | Nohtomi | H04N 1/00244 358/1.15 |
| 8,229,905 B2 | 7/2012 | McFarland et al. | |
| 8,282,001 B2 * | 10/2012 | Snyder | G06K 7/10544 235/462.01 |
| 9,233,399 B2 * | 1/2016 | Moore | B07C 3/14 |
| 2003/0145057 A1 | 7/2003 | Throop | |
| 2003/0160095 A1 * | 8/2003 | Segal | G06F 17/30011 235/375 |
| 2005/0067482 A1 * | 3/2005 | Wu | G06Q 10/10 235/375 |
| 2005/0080721 A1 * | 4/2005 | Kearney | G06Q 20/10 705/38 |
| 2007/0220614 A1 * | 9/2007 | Ellis | G06F 21/6245 726/27 |
| 2009/0067013 A1 * | 3/2009 | Dixon | G06F 17/30011 358/486 |
| 2011/0025842 A1 * | 2/2011 | King | G06F 17/211 348/135 |
| 2011/0081051 A1 * | 4/2011 | Tayal | G06K 9/036 382/112 |
| 2014/0293367 A1 * | 10/2014 | St. Jacques, Jr. | H04N 1/00005 358/474 |

OTHER PUBLICATIONS

White Paper, CDW People Who Get It, "Legal Ease: Electronic-Document Management," 2012, 4 pages.
Iron Mountain, "Document Imaging and Management", http://www.ironmountain.com/Services/Document-Imaging-and-Management.aspx#sthash.8HIj1DQM.dpuf, provided by associate Oct. 14, 2015, 2 pages.
Berman, Joel, MPA PMP ECM, "Developing a Rational Approach to Paperless Lending", FiS 2010 Client Conference, 2010 Fidelity National Information Service, Inc. and it subsidiaries, 23 pages.
Feature Matrix, The Laserfiche enterprise content management system, provided by associate Oct. 14, 2015, 10 pages.
Open Source Document Management, OpenKM, web base document management application, provided by associate Oct. 14, 2015, 1 page.
RicohDocs, document management system, provided by associate Oct. 14, 2015, 2 pages.

* cited by examiner

COMPUTER IMPLEMENTED SYSTEM AND METHOD FOR MANAGING A STACK CONTAINING A PLURALITY OF DOCUMENTS

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

IDS (Information Disclosure Statement) is submitted along with response.

BACKGROUND OF THE INVENTION

(1) Field of the Invention

The present disclosure relates to the field of document management.

(2) Background Art

Every organization requires regulation and maintenance of huge amount of information which may be in the form of paper-based documents and/or electronic documents. In a business environment, the method of managing documents usually involves interface between electronic devices and, paper-based documents and/or electronic documents. This is a time consuming process which tends to be very costly as it involves storing, maintaining, and accessing large number of documents. Scanning is a commercially well-known solution for maintaining huge amount of documents. It typically involves scanning of documents and manually sorting them in order to store them for future reference. But, the conventional document management systems require ample time in capturing, scanning and processing the documents and saving or transferring the documents on a shared drive. Such systems usually do not provide real-time synchronization and, searching and tracking such documents is a tedious task. Another problem faced by such systems is lack of security during data transfer of the managed documents. Many users and organizations require a fully-integrated system for tracking and maintaining documents without any technical assistance.

Therefore, there is felt a need for a system that limits the aforementioned drawbacks.

Definitions of Terms Used in the Specification

The expression 'batch' used hereinafter in this specification refers to set of documents separated by separating pages.

These definitions are in addition to those expressed in the art.

Objects

Some of the objects of the system and method of the present disclosure, which at least one embodiment herein satisfies, are as follows:

An object of the present disclosure is to provide a computer implemented system for managing a stack containing a plurality of documents.

Another object of the present disclosure is to provide real-time synchronization for document scanning and processing.

Still another object of the present disclosure is to provide an option of prioritizing the scanning by sending request through external trigger like email and SMS.

Another object of the present disclosure is to provide search capabilities that enable operations like easy searching and tracking of the required documents.

Further object of the present disclosure is to store documents into a repository and retrieve them based on certain filtration criteria for future references.

Still another object of the present disclosure is to allow scanning of multiple documents in batches and managing these batches by using functionalities such as indexing, image enhancement and document verification.

Yet another object of the present disclosure is to provide an automatic output at a scheduled time for all documents provided by users.

Another object of the present disclosure is to provide an option to generate and receive MIS reports through email and/or SMS to the system.

Another object of the present disclosure is to provide security transfer of documents between system and users.

Other objects and advantages of the present disclosure will be more apparent from the following description when read in conjunction with the accompanying figures, which are not intended to limit the scope of the present disclosure.

BRIEF SUMMARY OF THE INVENTION

The present disclosure envisages a computer implemented system for managing a stack containing a plurality of documents.

Typically in accordance with the present disclosure, the system for managing a stack containing a plurality of documents separated by separating pages and submission forms comprises a scanning and batch module adapted to accept the stack to be managed. The scanning and batch module comprises a tracking module that creates within the stack, batches of documents separated by the submission forms and also identifies pre-defined fields on the submission forms to allot track numbers to each of the batches. A pre-scanner present in the scanning and batch module identifies within the batches, at least one document separated by the separating pages and allots priority to the documents within the batches. A batch processor is configured to receive these identified prioritized documents and allot a barcode to each of the documents within the batches. A scanner then receives these batches with allotted track numbers containing prioritized documents with allotted barcodes and scans the documents according to the priority to obtain images of the scanned barcoded documents. These images of the scanned barcoded documents are received by an image enhancement module cooperating with the scanner. The image enhancement module comprises a camera that captures images of the barcoded documents, a comparator that compares the captured images of the barcoded documents with images of the scanned barcoded documents to verify image quality of the scanned images and identify the barcoded documents that do not meet a pre-defined quality criteria, a re-scanning module that re-scans the barcoded documents identified by the comparator, and an image editor that identifies and removes blank pages from the quality verified images of scanned documents to obtain edited images of scanned documents with corresponding track numbers and barcodes. A folder creator present in the scanning and batch module cooperates with the image enhancement module to receive the edited images of scanned documents with corresponding track numbers and barcodes, and creates folders containing the edited images with corresponding barcodes, and further associates track numbers of corresponding batches to the created folders. A local repository receives these folders and stores the folders with associated track numbers of corresponding batches. The system further comprises a workflow engine which cooperates with the local repository to receive the folders and process the stored images of scanned documents within the folders. The workflow engine comprises an indexer which is configured to receive the folders and identify meta-data from images within the folders to obtain indexed folders containing indexed images. The workflow engine further comprises a quality checker which is configured to audit the indexed folders based on pre-configured quality check percentage to obtain folders containing quality checked images of documents. A central repository present in the system receives the indexed folders containing the quality checked images of documents and stores the images with corresponding track numbers and barcodes, for selective retrieval.

In accordance with the present disclosure, there is provided a computer implemented method for managing a stack containing a plurality of documents separated by separating pages and submission forms, the method comprising the following:

accepting the stack to be managed;
creating within the accepted stack, batches of documents separated by the submission forms and identifying pre-defined fields on the submission forms and allotting track numbers to each of the batches;
identifying within the batches, at least one document separated by the separating pages and allotting priority to the documents within the batches;
identifying prioritized documents and allotting a barcode to each of the documents within the batches;
scanning the documents according to the priority to obtain images of the scanned barcoded documents;
capturing images of the barcoded documents;
comparing the captured images of the barcoded documents with images of the scanned barcoded documents and verifying image quality of the scanned images;
identifying the barcoded documents that do not meet a pre-defined quality criteria and re-scanning the identified barcoded documents;
identifying and removing blank pages from the quality verified images of scanned documents to obtain edited images of scanned documents with corresponding track numbers and barcodes;
creating folders containing the edited images with corresponding barcodes, and associating track numbers of corresponding batches to the created folders;
storing the folders with associated track numbers of corresponding batches;
identifying meta-data from stored images within the folders to obtain indexed folders containing indexed images;
auditing the indexed folders based on pre-configured quality check percentage to obtain folders containing quality checked images of documents; and
storing the indexed folders containing the quality checked images of documents with corresponding track numbers and barcodes for selective retrieval.

BRIEF DESCRIPTION OF THE SEVERAL VIEWS OF THE DRAWING(S)

A computer implemented system for managing a stack containing a plurality of documents of the present disclosure will now be described with the help of accompanying drawings, in which.

DETAILED DESCRIPTION OF THE INVENTION

Figure 1:
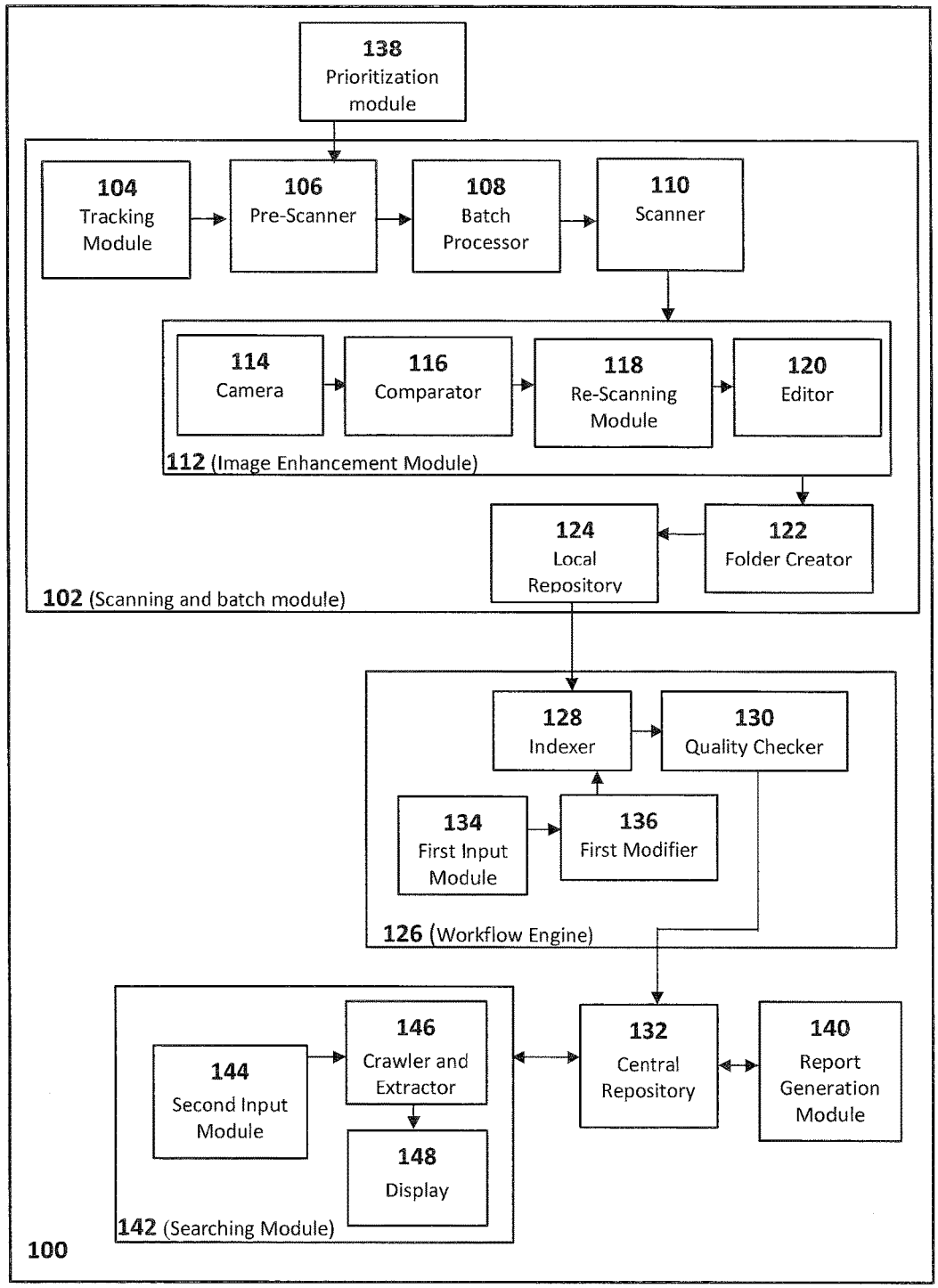
FIG. 1 illustrates a schematic of the system for managing a stack containing a plurality of documents.
Figure 2A:
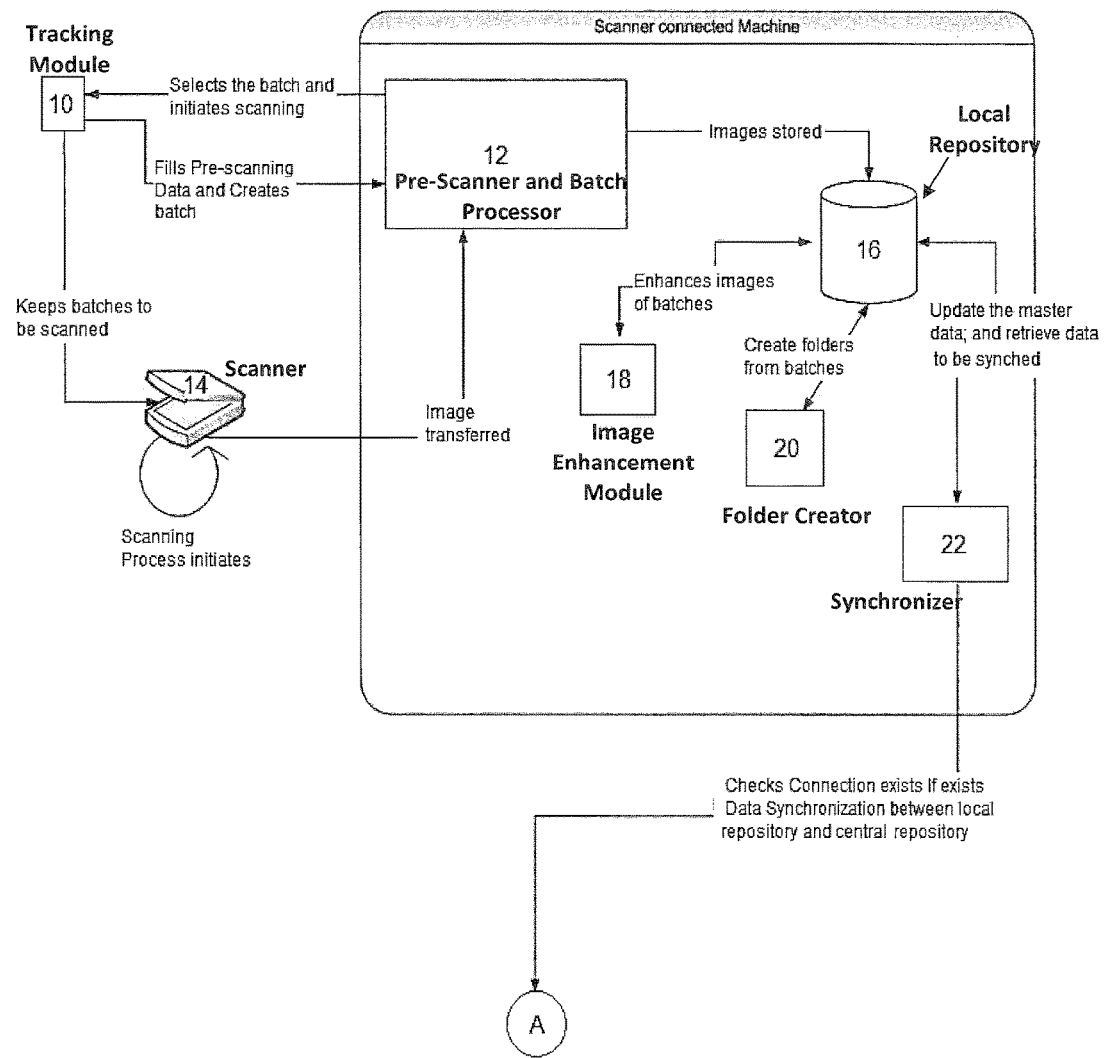
FIGS. 2a, 2b, 2c and 2d illustrate an architecture flow diagram of one embodiment of the present disclosure.
Figure 2B:
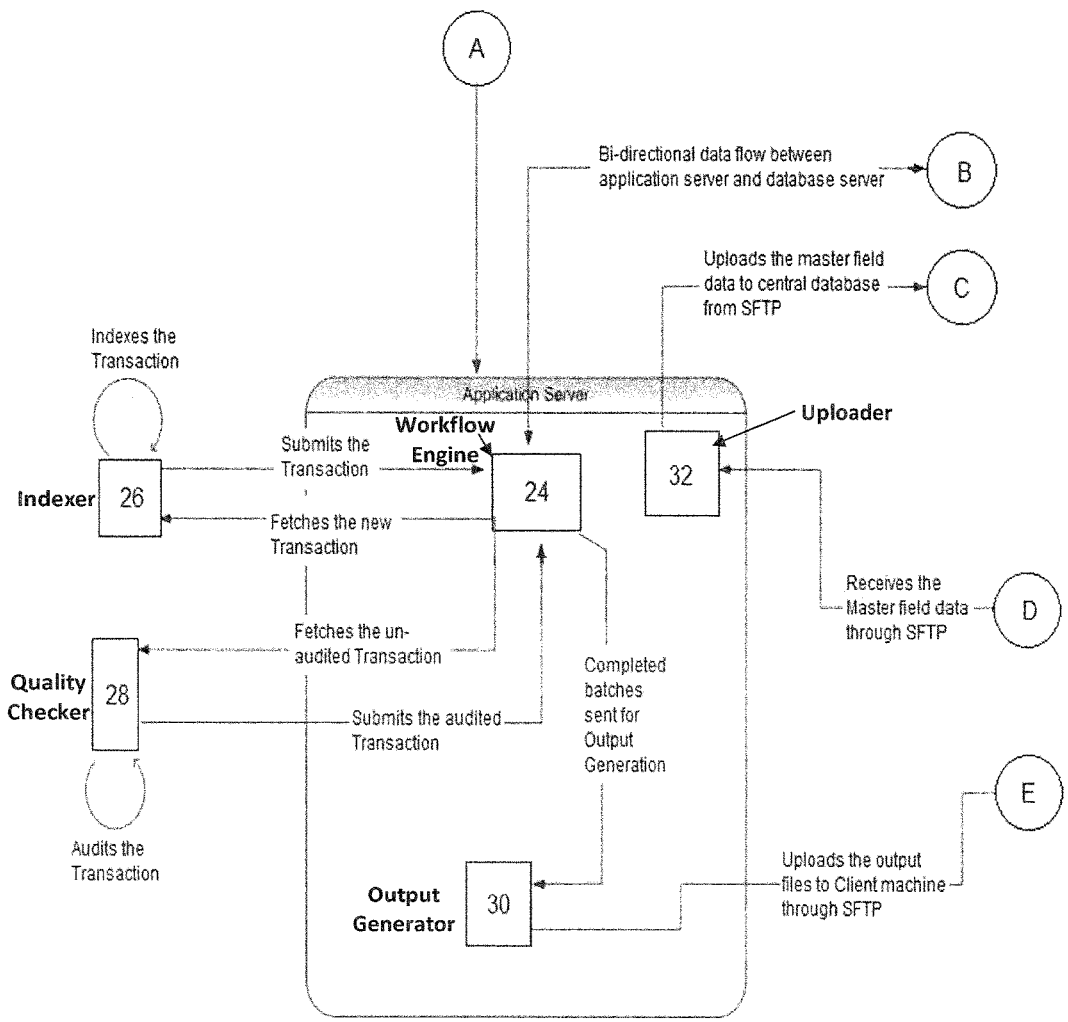
Figure 2C:
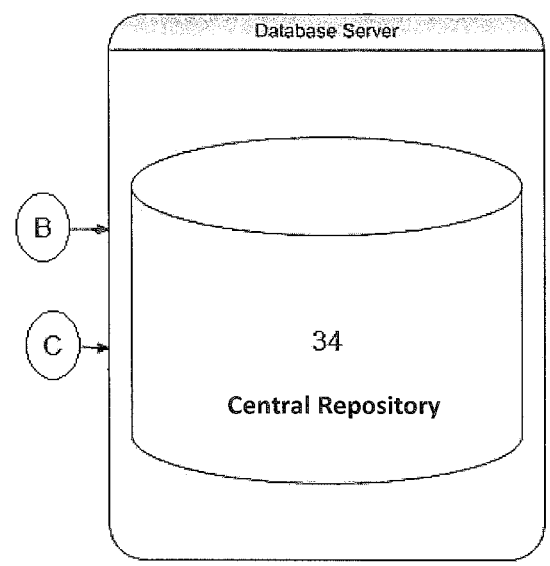
Figure 2D:
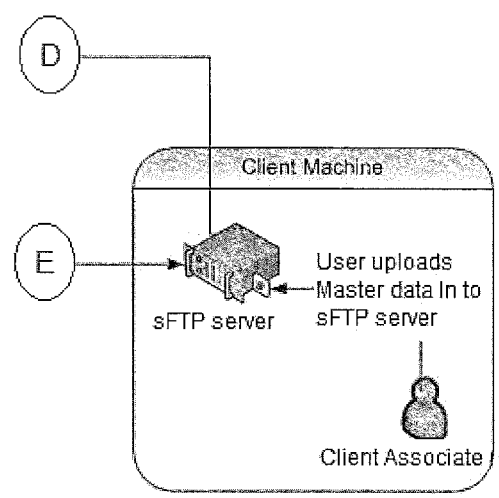

A preferred embodiment of the present disclosure will now be described in detail with reference to the accompanying drawings. The preferred embodiment does not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The following description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The present disclosure provides a computer implemented system for managing a stack containing a plurality of documents. The system includes a scanning and batch module to scan and manage the documents in form of batches. Multiple users can provide the documents to be managed in form of a stack. These documents need to be separated by the separating pages and submission forms which help in identifying and associating particular batch of documents to a particular user. The submission forms and separating pages are created and inserted automatically between the batches and the documents respectively by a stack manager present in the system. The submission forms are then identified by the system to identify the batches and allot track numbers to the identified batches for future reference. Documents within the batches are identified by the separating pages and are allotted barcodes for identification. These documents are then scanned and processed to obtain images of the documents which are then stored in folders. These folders are associated with track numbers of the corresponding batches in order to identify the batches from a particular user. This system allows rescanning of the previously scanned documents without having to scan a new document/batch. The system includes a camera that captures images of the original documents and compares them with the scanned images of the same documents to verify the scanned documents. An error in the process of scanning is also detected and the user can also access scanned soft copy documents by using email or sms as a trigger. The system also provides a quality checker which checks if the quality of the scanned documents is up to a pre-determined mark. If the quality is unsatisfactory, there is provision to improve the quality of scanned images of the documents. The system also allows the users to send email and/or sms to change/set prioritization of a request or document type. On reception of the sms/email, the system sets the priority to a particular document/batch and the document is processed accordingly. The system also includes a workflow engine which allows automatic indexing, routing of the transactions, processing, quality check, and modification in the scanned images.

Figure 3A:
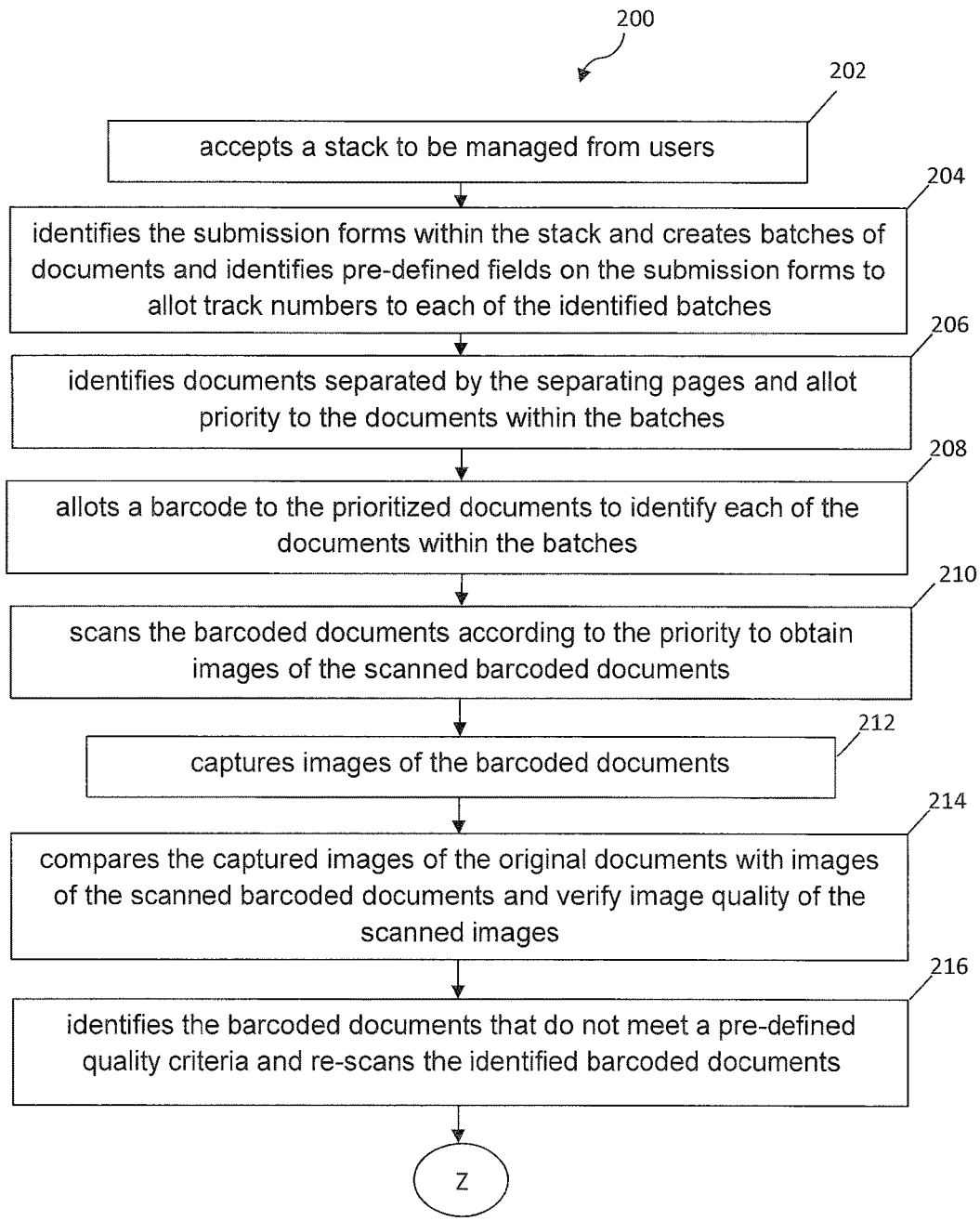
FIGS. 3a and 3b illustrates a flow diagram in accordance with one embodiment of the method for managing a stack containing a plurality of documents.
Figure 3B:
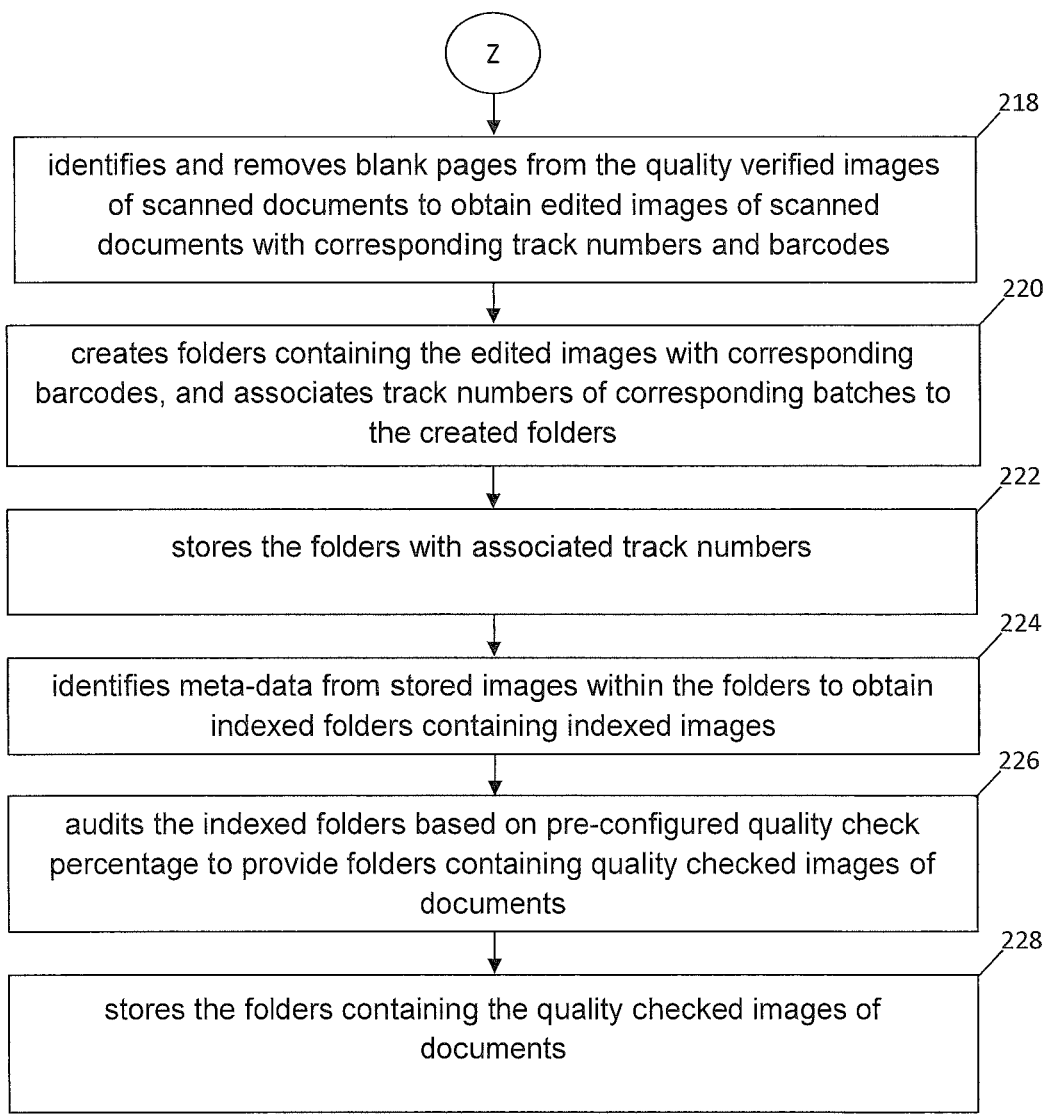

Referring to the accompanying drawings, FIG. 1 illustrates a schematic of a computer implemented system 100 for managing a stack containing a plurality of documents separated by separating pages and submission forms, and FIG. 3a and FIG. 3b illustrates a flow diagram in accordance with one embodiment of the method 200 for managing a stack containing a plurality of documents. The system 100 includes a scanning and batch module 102 that accepts stack of documents to be managed from users, (202). This stack includes separating pages as well as submission forms between the documents. A tracking module 104 identifies the submission forms within the stack accepted by the scanning and batch module 102 and creates batches of documents. These submission forms include pre-defined fields which are identified by the tracking module 104 to allot track numbers to each of the identified batches (204). A pre-scanner 106 uses these batches and identifies documents that are separated by the separating pages within the batches and then allots priority to the documents within the batches (206). Usually, the documents are prioritized on first in first out method, but the priority for processing these documents can be altered by a prioritization module 138. The prioritization module 138 accepts prioritization requests from users in a pre-determined format and modifies the priority of the documents allotted by the pre-scanner 106 based on the user requests. User can send prioritization requests to the system 100 through an email/sms in a pre-determined format. For example, an email format can include: 'Subject line format: Priority Document Type <Document Type Name> or Priority Request ID <Request ID> or Priority Client Name <Client Name>' and a sms format can include: 'SMS: SMS format: Priority Document Type <Document Type Name> or Priority Request ID <Request ID> or Priority Client Name <Client Name>'. Once the email/sms is received by the system 100 in the abovementioned format, it will automatically move the requested document to a high priority queue. A batch processor 108 receives the prioritized documents from the pre-scanner 106 and allots a barcode to the documents to identify each of the documents within the batches, (208). A scanner 110 receives these batches with allotted track numbers containing prioritized documents with allotted barcodes and scans the barcoded documents according to the priority to obtain images of the scanned barcoded documents, (210). These images of the scanned barcoded documents are received by an image enhancement module 112 which enhances the quality of the images of the scanned documents. The image enhancement module 112 includes a camera 114 that captures images of the original barcoded documents (212). A comparator 116 included in the image enhancement module 112 uses the images captured by the camera 114 and compares the captured images of the original documents with images of the scanned barcoded documents to verify image quality of the scanned images (214). After comparison, the comparator 116 based on its verification, identifies the barcoded documents that do not meet pre-defined quality criteria and provides the details of such documents to a re-scanning module 118. The re-scanning module 118 scans the barcoded documents (216) identified by the comparator 116 in order to improve the image quality. An image editor 120 included in the image enhancement module 112 identifies and removes blank pages from the quality verified images of scanned documents to obtain edited images of scanned documents with corresponding track numbers and barcodes, (218). A folder creator 122 present in the scanning and batch module 102 receives the edited images of scanned documents and corresponding track numbers and barcodes from the image enhancement module 112, and creates folders containing the edited images with corresponding barcodes, (220). The folder creator 122 further associates track numbers of corresponding batches to the created folders and barcodes to the corresponding images within the folders, (220). A local repository 124 to receives these folders and stores the folders with associated track numbers, (222). A workflow engine 126 present in the system 100 cooperates with the local repository 124 to receive the folders and processes the stored images of the scanned documents within the folders. The workflow engine 126 includes an indexer 128 that identifies meta-data from images within the folders to obtain indexed folders containing indexed images, (224). These indexed folders are then checked for quality by a quality checker 130. The quality checker 130 audits the indexed folders based on pre-configured quality check percentage to provide folders containing quality checked images of documents, (226). These folders containing quality checked images of documents are then stored in a central repository 132 for future use, (228).

The workflow engine 126 also includes a first input module 134 that receives user input corresponding to changes in the edited scanned images of documents within the folders and a first modifier 136 that modifies the images based on received user inputs. The system 100 includes a synchronizer (not shown in the figure) that synchronizes the scanning and batch module 102 and the workflow engine 126.

A report generation module 140 included in the system 100 accepts report generation requests from users in a pre-determined format and cooperates with the central repository 132 to generate customized management information system (MIS) reports. These report generation requests are accepted by the report generation module 140 in an email format and/or sms format. The generates MIS reports include user productivity reports, quality check reports, search document reports, volume trending reports, rejected document reports, audit trail reports, SLA reports and the like. The system 100 also includes a searching module 142 that cooperates with the central repository 132 to selectively retrieve stored scanned documents. The searching module 142 comprises a second input module 144 which accepts input from users related to the scanned documents that user wishes to retrieve/view. This input can be a track number of a particular batch, a barcode of a particular document or the indexed data and it can be provided to the second input module 144 through an email/sms. A crawler and extractor 146, based on this user input crawls through the central repository 132 and extracts the stored images of documents corresponding to accepted user input. A display 148 then displays the user requested extracted images. The quality checker 130 sets a percentage of quality check (QC) to obtain quality checked batch documents. In one embodiment an administrator sets the QC samples on the basis of user requirements. The system 100 follows auto QC allocation.

In another embodiment of the present disclosure all the transactions in the workflow engine 126 can either be self-assigned by a team member using assign transaction option.

The report generation module 140 generates MIS reports that are based on productivity, volumes, root cause analysis, error trend analysis based on pre-defined parameters, transaction status and non-productive time spent by the users.

The system 100 is configured to electronically archive the documents and allow access to archived documents for a certain time frame. Users can send an email, SMS to archive the request, document type, and data without physical presence. The system of the present disclosure automatically archives the requested record, document type and data, where, the archived documents can be searched and retrieved based on common fields or process-specific fields. The images of scanned documents can be viewed with the meta-data and workflow history details.

The system 100 also accepts scanned soft copies of documents through email which can be then processed by the system 100. The system 100 can also increase the quality of scanned image by changing its contrast, brightness and settings. It also allows deletion of stored documents from the central repository 132 after a configurable time frame.

Referring to the accompanying drawings, FIGS. 2a, 2b, 2c and 2d illustrate an architecture flow diagram of one embodiment of the present disclosure. The figures illustrate the architecture flow of an embodiment where a client associate is able to securely receive a managed stack of documents and is able to make changes in the managed documents according to his convenience. These managed documents are stored in a central repository 34 for future reference. In this embodiment, a tracking module 10 receives a stack containing plurality of documents separated by separating pages and submission forms. A client associate can provide the stack of documents to be managed to the tracking module 10. On reception of the stack, the tracking module 10 allots track numbers to each of the batches and fills pre-scanning data to send it to a pre-scanner and batch processor 12 for creating batches of the documents within the stack. The pre-scanner and batch processor 12 allot priority to the documents within the batches along with a barcode for every document. The tracking module based on this priority selects the batch to be managed and initiates scanning by providing the batch to be scanned to a scanner 14. The images obtained on scanning the documents are then stored in a local repository 16 for further processing. An image enhancement module 18 receives these stored images of scanned documents and verifies the image quality on pre-defined quality criteria. The image enhancement module 18 also identifies and removed images of scanned blank pages to obtain edited images of scanned documents which are then stored in the local repository 16. A folder creator 20 uses these stored edited images of scanned documents to create folders containing the edited images with corresponding barcodes and also associates the track numbers of corresponding batches to the created folders so that the client associate can access directly, the folder containing scanned images of the documents of his interest. These folders are also stored in the local repository 16 for further processing. A synchronizer 22 provides connection between the local repository 16 and the central repository 34 for data synchronization. The folders containing edited images stored in the local repository are transmitted to an application server which comprises a workflow engine 24. These folders are provided by the workflow engine 24 to an indexer 26 which identifies meta-data from images within the folders and indexes the images based on the meta-data to obtain indexed folders containing indexed images. A quality checker 28 audits these indexed folders based on pre-configured quality check percentage to obtain quality checked images of documents. The quality checked images of documents are then provided to the workflow engine 24 which sends these images for output generation to an output generator 30. The output generator 30 securely uploads the generated output files to client machine through sFTP (secure File Transfer Protocol). The sFTP server on the client machine allows the client associate to view, modify and/or add files and retrieve the generated output. When the client associate edits the output files, the sFTP server transmits these files to an uploader 32 which in turn uploads the files which are the scanned images of the documents that are edited by the client associate, to the central repository 34.

The application server is connected to a database server such that the connection allows bi-directional data flow between them. This enables the workflow engine 24 to send and receive the quality checked images of documents from the central repository 34.

Technical Advancements

A computer implemented system for managing a stack containing a plurality of documents described herein above has several technical advancements including but not limited to the realization of:

- a system that provides a real-time synchronization for document scanning and processing;
- a system that provides an option of prioritizing the scanning by sending request through an external trigger like email/SMS;
- a system that provides search capabilities that enable operations to easy searching and tracking of the required documents;

a system that stores documents into a repository and retrieve them based on certain filtration criteria for future references;

a system that enables scanning of multiple documents in batches and managing these batches by using functionalities such as indexing, image enhancement and document verification;

a system that provides an automatic output at a scheduled time for all the documents provided by users;

a system that provides an option to generate and receive the MIS reports through email and/or SMS to the system; and a system that provides security transfer of document between system and users.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A computer implemented system for managing a stack containing a plurality of documents separated by separating pages and submission forms, said system comprises:

a scanning and batch module adapted to accept said stack to be managed, said scanning and batch module comprises:

a tracking module configured to create within said stack, batches of documents separated by said submission forms, and further configured to identify pre-defined fields on the submission forms to allot track numbers to each of said batches;

a pre-scanner configured to identify within said batches, at least one document separated by the separating pages, said pre-scanner further configured to allot priority to said documents within said batches;

a batch processor configured to receive said identified prioritized documents and configured to allot a barcode to each of said documents within the batches;

a scanner configured to receive said batches with allotted track numbers containing the prioritized documents with the allotted barcodes and scan said documents according to the priority to obtain images of said scanned barcoded documents;

an image enhancement module cooperating with the scanner to receive said barcoded documents and the images of scanned barcoded documents, said image enhancement module comprising:

a camera configured to capture images of said barcoded documents;

a comparator configured to compare the captured images of said barcoded documents with images of said scanned barcoded documents to verify image quality of said scanned images, and identify the barcoded documents that do not meet a pre-defined quality criteria;

a re-scanning module configured to re-scan the barcoded documents identified by the comparator; and an image editor configured to identify and remove blank pages from said quality verified images of scanned documents to obtain edited images of scanned documents with corresponding track numbers and barcodes;

a folder creator cooperating with the image enhancement module to receive the edited images of scanned documents with corresponding track numbers and barcodes, and configured to create folders containing said edited images with corresponding barcodes, and further configured to associate track numbers of corresponding batches to the created folders; and a local repository configured to receive said folders and store said folders with associated track numbers of corresponding batches;

a workflow engine cooperating with the local repository to receive said folders and process said stored images of scanned documents within the folders, said workflow engine comprises:

an indexer configured to receive said folders and identify meta-data from images within the folders to obtain indexed folders containing indexed images; and a quality checker configured to audit said indexed folders based on pre-configured quality check percentage to obtain folders containing quality checked images of documents; and a central repository configured to receive the indexed folders containing said quality checked images of documents and store said images with corresponding track numbers and barcodes, for selective retrieval.

2. The system as claimed in claim 1, wherein said workflow engine further comprises:

a first input module configured to receive user input corresponding to changes in said edited scanned images of documents within the folders; and a first modifier cooperating with the first input module to receive said user inputs and configured to modify said images based on received user inputs.

3. The system as claimed in claim 1, wherein said system comprises a prioritization module cooperating with the pre-scanner and configured to accept prioritization requests from users in a pre-determined format and modify the priority of said documents allotted by the pre-scanner, said prioritization requests accepted in a format selected from the group of email format, sms format and any combinations thereof.

4. The system as claimed in claim 1, wherein said system comprises a report generation module cooperating with the central repository and configured to accept report generation requests from users in a pre-determined format and generate customized management information system (MIS) reports, said report generation requests accepted in a format selected from the group of email format, sms format and any combinations thereof.

5. The system as claimed in claim 4, wherein said generated MIS reports comprises reports selected from the group of user productivity report, quality check report, search document report, volume trending report, rejected document report, audit trail report, SLA report and any combinations thereof.

6. The system as claimed in claim 1, wherein said system comprises a stack manager configured to create submission forms for each of said batches and separating pages for each of said plurality of documents within the batches and also configured to insert the submission forms and separating pages at appropriate locations between the batches and the documents respectively.

7. The system as claimed in claim 1, wherein said system includes a searching module cooperating with the central repository to selectively retrieve stored scanned documents, said searching module comprises:
- a second input module configured to accept input from users related to said scanned documents for selective retrieval of said documents, wherein said input is selected from the group of track numbers, barcodes, indexes and any combinations thereof;
- a crawler and extractor cooperating with the second input module and configured to crawl through the central repository and extract the stored images of documents corresponding to user input; and
- a display cooperating with said crawler and extractor to receive said extracted stored images and configured to display the selectively extracted images.

8. The system as claimed in claim 7, wherein said second input module accepts user inputs in a format selected from the group of email format, sms format and any combinations thereof.

9. The system as claimed in claim 1, wherein said system comprises a synchronizer configured to synchronize said scanning and batch module and said workflow engine.

10. A computer implemented method for managing a stack containing a plurality of documents separated by separating pages and submission forms, said method comprising the following:
- accepting, by a scanning and batch module, said stack to be managed;
- creating, by a tracking module, within said accepted stack, batches of documents separated by said submission forms and identifying pre-defined fields on the submission forms and allotting track numbers to each of said batches;
- identifying, by a pre-scanner, within said batches, at least one document separated by the separating pages and allotting priority to said documents within said batches;
- receiving, by a batch processor, said identified prioritized documents and allotting a barcode to each of said documents within the batches;
- scanning, by a scanner, said documents according to the priority to obtain images of said scanned barcoded documents;
- capturing, by a camera, images of said barcoded documents;
- comparing, by a comparator, the captured images of said barcoded documents with images of said scanned barcoded documents and verifying image quality of said scanned images;
- identifying, by said comparator, the barcoded documents that do not meet a pre-defined quality criteria;
- re-scanning, by a re-scanning module, the identified barcoded documents;
- identifying and removing, by an image editor, blank pages from said quality verified images of scanned documents to obtain edited images of scanned documents with corresponding track numbers and barcodes;
- creating, by a folder creator, folders containing said edited images with corresponding barcodes, and associating track numbers of corresponding batches to the created folders;
- storing, in a local repository, said folders with associated track numbers of corresponding batches;
- identifying, by an indexer, meta-data from stored images within the folders to obtain indexed folders containing indexed images;
- auditing, by a quality checker, said indexed folders based on pre-configured quality check percentage to obtain folders containing quality checked images of documents; and
- storing, by a central repository, the indexed folders containing said quality checked images of documents with corresponding track numbers and barcodes for selective retrieval.

11. The method as claimed in claim 10, wherein said method further comprises steps of receiving, by a first input module, user input corresponding to changes in said edited scanned images of documents within the folders and modifying, by a first modifier, said images based on received user inputs.

12. The method as claimed in claim 10, wherein said method further comprises steps of accepting, by a prioritization module, prioritization requests from users in a pre-determined format and modifying the priority of said documents, and accepting said prioritization requests in a format selected from the group of email format, sms format and any combinations thereof.

13. The method as claimed in claim 10, wherein said method further comprises steps of accepting, by a report generation module, report generation requests from users in a pre-determined format and generating customized management information system (MIS) reports, and accepting said report generation requests in a format selected from the group of email format, sms format and any combinations thereof.

14. The method as claimed in claim 13, wherein said generated MIS reports comprises reports selected from the group of user productivity report, quality check report, search document report, volume trending report, rejected document report, audit trail report, SLA report and any combinations thereof.

15. The method as claimed in claim 10, wherein said method further comprises steps of creating, by a stack manager, submission forms for each of said batches and separating pages for each of said plurality of documents within the batches, and inserting the submission forms and separating pages at appropriate locations between the batches and the documents respectively.

16. The method as claimed in claim 10, wherein said method further comprises steps of selectively, by a searching module, retrieving stored scanned documents, said step of retrieving comprises the following:
- accepting, by a second input module, input from users related to said scanned documents for selective retrieval;
- selecting, by said second input module, said input from the group of track numbers, barcodes, indexes and any combinations thereof;
- crawling, by a crawler and extractor, through the stored indexed folders and extracting the stored images of documents corresponding to accepted user input; and
- displaying, by a display, the selectively extracted images.

17. The method as claimed in claim 16, wherein said step of accepting, by the second input module, user inputs a format selected from the group of email format, sms format and any combinations thereof.

\* \* \* \* \*